(12) United States Patent
Burke et al.

(10) Patent No.: US 7,992,479 B2
(45) Date of Patent: Aug. 9, 2011

(54) TABLE SAW

(75) Inventors: Jeremy J. Burke, Jackson, TN (US);
Jaime E. Garcia, Jackson, TN (US);
Jeffrey D. Weston, Jackson, TN (US);
Craig A. Carroll, Milan, TN (US);
Peter Chaikowsky, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 489 days.

(21) Appl. No.: 12/169,160

(22) Filed: Jul. 8, 2008

(65) Prior Publication Data
US 2010/0005939 A1   Jan. 14, 2010

(51) Int. Cl.
*B23D 45/06* (2006.01)
(52) U.S. Cl. .................. 83/477.2; 83/473; 83/477.1
(58) Field of Classification Search .................. 144/420; 33/640, 641, 628; 83/477.2, 471.3, 522.15, 83/581, 490, 767, 473, 521, 522.11, 477.1, 83/471.1, 522.25, 522.17, 522.16
See application file for complete search history.

(56) References Cited

U.S. PATENT DOCUMENTS

| | | | | |
|---|---|---|---|---|
| 2,355,381 | A | * | 8/1944 | Lear ................................ 33/750 |
| 2,374,298 | A | * | 4/1945 | Nasset ............................ 33/534 |
| 3,011,529 | A | | 12/1961 | Copp |
| 6,994,008 | B2 | | 2/2006 | Liao |
| 2005/0188806 | A1 | * | 9/2005 | Garcia et al. .................. 83/471.3 |
| 2005/0199113 | A1 | * | 9/2005 | Ku et al. .......................... 83/473 |

FOREIGN PATENT DOCUMENTS

EP    1110650 A    6/2001

OTHER PUBLICATIONS

Luciano Meritano, European Search Report, Sep. 10, 2008, Munich, Germany.
Annex to the European Search Report on European Patent Application No. EP 08 15 9642.

* cited by examiner

*Primary Examiner* — Ghassem Alie
(74) *Attorney, Agent, or Firm* — Adan Ayala

(57) ABSTRACT

A table saw includes a base assembly, a table assembly supported by the base assembly, a saw assembly connected to at least one of the base assembly and the table assembly, the saw assembly having a blade extending through the table assembly, a height adjustment assembly for adjusting the height of the blade, the height adjustment assembly comprising a height adjustment wheel, and bevel adjustment assembly for adjusting the bevel angle of the blade, the bevel adjustment assembly comprising a bevel adjustment wheel. The height and bevel adjustment wheels are disposed at the front of the base assembly. The position of the height and bevel adjustment wheels relative to the front of the base assembly does not change regardless of the blade height and bevel angle.

4 Claims, 4 Drawing Sheets

TABLE SAW

FIELD

This specification relates to table saws and more specifically to height and bevel adjustment mechanisms for table saws.

BACKGROUND

It is well known in the table saw field to provide height and bevel adjustment mechanisms in order to adjust the height and/or the bevel angle of the blade extending through the table. In dual-crank solutions, one crank is provided to adjust the blade height, while another crank is provided to adjust the bevel angle. Typically, the blade height crank moves along a slot in the base of the table saw when the bevel angle is adjusted. See, e.g., U.S. Pat. Nos. 6,283,002 and 6,994,008, which are hereby wholly incorporated by reference.

SUMMARY

A table saw including a base assembly, a table assembly supported by the base assembly, a saw assembly connected to at least one of the base assembly and the table assembly, the saw assembly having a blade extending through the table assembly, a height adjustment assembly for adjusting the height of the blade, the height adjustment assembly comprising a height adjustment wheel, and bevel adjustment assembly for adjusting the bevel angle of the blade, the bevel adjustment assembly comprising a bevel adjustment wheel. The height and bevel adjustment wheels are disposed at the front of the base assembly. The position of the height and bevel adjustment wheels relative to the front of the base assembly does not change regardless of the blade height and bevel angle.

Additional features and benefits of the present invention are described, and will be apparent from, the accompanying drawings and the detailed description below.

BRIEF DESCRIPTION OF THE FIGURES

The accompanying drawings illustrate preferred embodiments according to the practical application of the principles thereof, and in which:

FIG. 4 illustrates a bevel stop assembly according to the invention, where

DETAILED DESCRIPTION

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
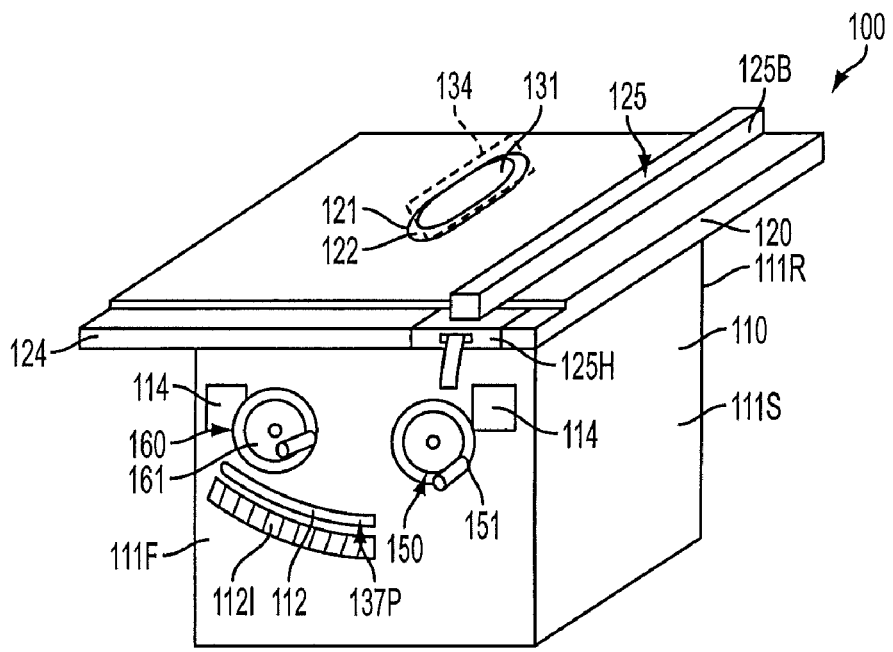
FIG. 1 is an exemplary table saw incorporating the invention.
Figure 4A:
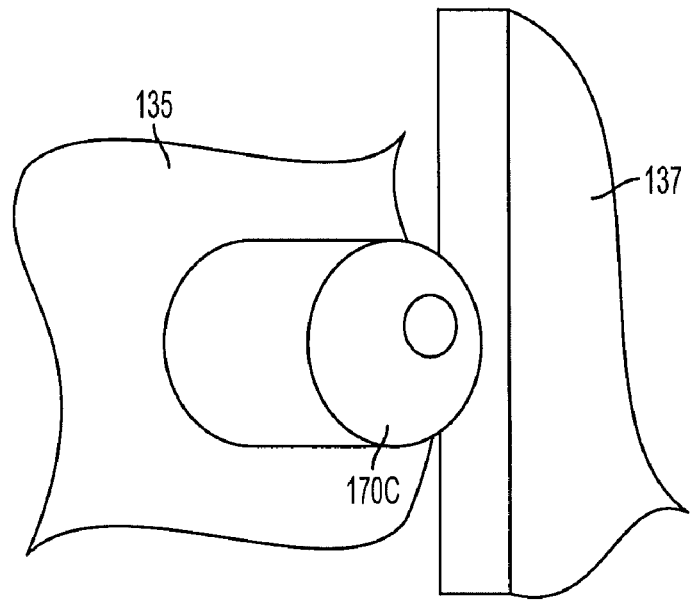
FIGS. 4A-4B are rear and front perspective views, respectively.
Figure 2:
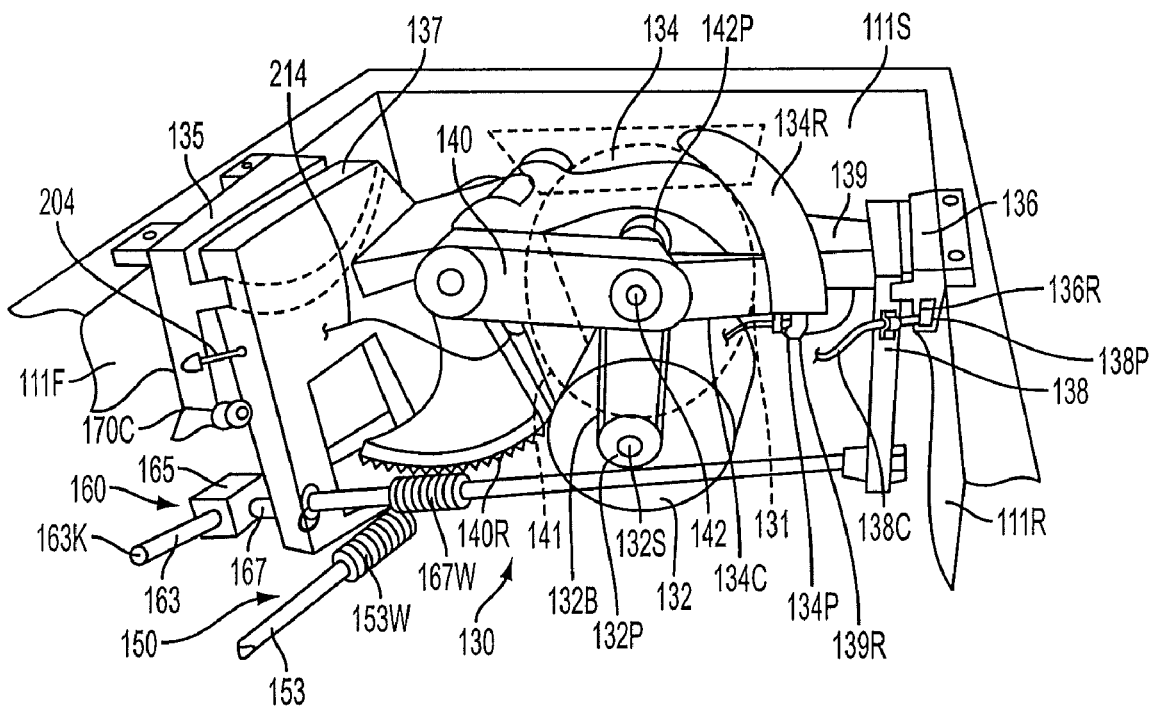
FIG. 2 is a partial perspective view of the saw assembly in the table saw of FIG. 1.
Figure 3:
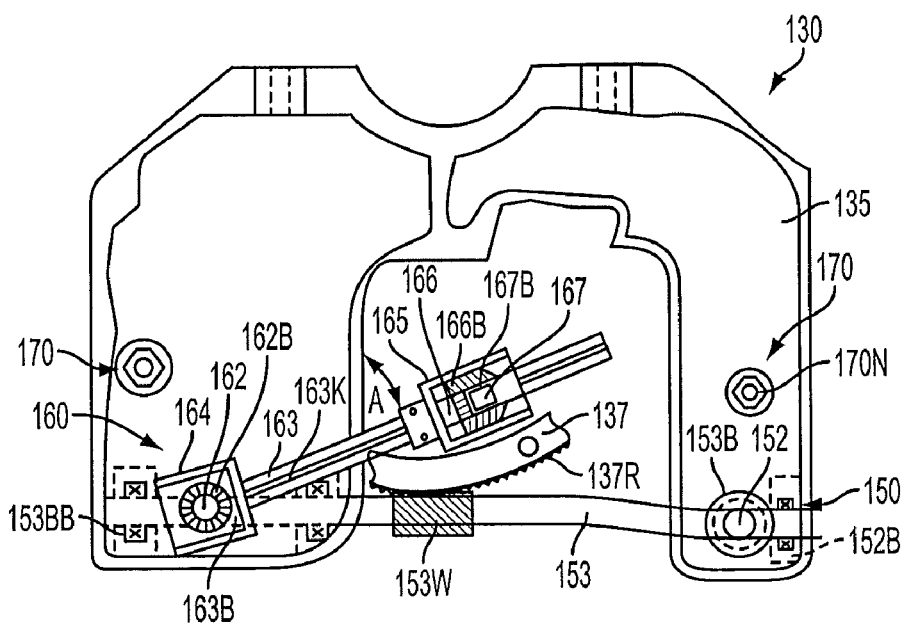
FIG. 3 is a partial front view of the saw assembly of FIG. 2.

Referring to FIGS. 1-3, a table saw 100 preferably includes a base assembly 110. Base assembly 110 may comprise a cabinet and/or panels that have been connected to each other. Preferably, base assembly 110 has a front panel 111F, a rear panel 111R, and at least one side panel 111S. Persons skilled in the art will recognize that front panel 111F, a rear panel 111R, and side panel(s) 111S may be made of plastic or sheet metal.

Base assembly 110 preferably supports a table assembly 120. Table assembly 120 preferably has an opening 121 that allows a blade 131 to extend therethrough. The opening 121 may support a removable plate 122 as is well known in the art. Persons skilled in the art will recognize that table assembly 120 may be made of cast iron.

A fence rail 124 may be attached to the base assembly 110 and/or table assembly 120. A fence 125 may be slidably disposed on fence rail 124 and/or table assembly 120. Preferably, fence 125 has a fence beam 125B that is partly supported by table assembly 120, and a fence head 125H connected to the fence beam 125B disposed on the fence rail 124. Fence head 125H may have a lock to fix the position of fence 125 along fence rail 124, as is well known in the art.

A saw assembly 130 is pivotably connected to the base assembly 110 and/or the table assembly 120. Preferably saw assembly 130 comprises a front fixed plate 135 attached to front panel 111F, a rear fixed plate 136 attached to rear panel 111R, a front trunnion plate 137 pivotally connected to the front fixed plate 135, a rear trunnion plate 138 pivotally connected to the rear fixed plate 136, and a beam 139 connecting the front and rear trunnion plates 137, 138. Persons skilled in the art will recognize that front trunnion plate 137, rear trunnion plate 138 and beam 139 may be combined into one piece. In addition, persons skilled in the art will recognize that front fixed plate 135, front trunnion plate 137, rear trunnion plate 138, rear fixed plate 136, and/or beam 139 may be made of cast iron.

Beam 139 may pivotally support arbor bracket 140, allowing arbor bracket 140 to rotate about a substantially horizontal axis. Arbor bracket 140 preferably supports arbor 142 upon which blade 131 is disposed thereon.

Beam 139 may also pivotally support motor support arm 141, allowing motor support arm 141 to rotate about a substantially horizontal axis, said axis preferably being the same rotational axis of arbor bracket 140. Arbor bracket 140 may be connected to motor support arm 141 so that they move together. Persons skilled in the art will recognize that arbor bracket 140 and/or beam motor support arm 141 may be made of cast iron.

Motor support arm 141 is preferably connected to motor 132. Motor 132 has a shaft 132S, which in turn may support a pulley 132P. Similarly, arbor 142 may have a pulley 142P. A driving belt 132B is disposed thereon, so that motor 132 can rotate arbor 142 (and thus blade 131).

Arbor bracket 140 may also support a riving knife 134R, and a blade guard 134 disposed thereon for covering an upper portion of the blade 131.

It is preferable to provide a mechanism for adjusting the bevel angle of blade 131. Bevel adjustment assembly 150 preferably comprises a crank wheel 151 disposed adjacent to front panel 111F. Crank wheel 151 preferably drives a crank shaft 152 which extends through front panel 111F. Crank shaft 152 is preferably rotationally supported by front fixed plate 135. Crank shaft 152 may have a bevel gear 152B fixedly attached to crank shaft 152, so that bevel gear 152B rotates when crank wheel 151 and crank shaft 152 rotate. Persons skilled in the art will recognize that other gears may be used instead of bevel gear 152B. For example, spiral gears may be instead.

A drive shaft 153 is rotatably connected to front fixed plate 135. Preferably drive shaft 153 is supported by bearings, such as ball bearings 153BB. Drive shaft 153 has a bevel gear 153B disposed thereon and meshing with bevel gear 152B. Accordingly, drive shaft 153 rotates when crank wheel 151 and crank shaft 152 rotate.

Drive shaft 153 also has a worm gear 153W disposed thereon, which rotates when drive shaft 153, crank wheel 151 and crank shaft 152 rotate. Worm gear 153W preferably meshes with a rack 137R on front trunnion plate 137. Accordingly, when a user rotates crank wheel 151, crank and drive shafts 152, 153 rotate, causing the rotation of front trunnion plate 137. In this manner, the bevel angle of blade 131 can be adjusted.

Persons skilled in the art will recognize that crank and/or drive shafts 152, 153 may be made of steel. In addition, persons skilled in the art will recognize that bevel and/or worm gears 152B, 153B, 153W may be made of powdered metal or cut steel.

It is preferable to provide a mechanism for adjusting the height of blade 131. Height adjustment assembly 160 preferably comprises a crank wheel 161 disposed adjacent to front panel 111F. Crank wheel 161 preferably drives a crank shaft 162 which extends through front panel 111F. Crank shaft 162 is preferably rotationally supported by front fixed plate 135. Crank shaft 162 may have a bevel gear 162B fixedly attached to crank shaft 162, so that bevel gear 162B rotates when crank wheel 161 and crank shaft 162 rotate.

An intermediate shaft 163 has a bevel gear 163B disposed thereon and meshing with bevel gear 162B. Bevel gears 162B, 163B are disposed in a gear housing 164, which may be rotatably connected to front fixed plate 135 and/or to crank shaft 162, allowing the position of intermediate shaft 163 to change relative to crank shaft 162. In addition, gear housing 164 may also support intermediate shaft 163.

A sliding gear housing 165 is preferably disposed on intermediate shaft 163. Sliding gear housing 165 may move along the longitudinal axis of intermediate shaft 163 without rotating about such axis.

Sliding gear housing 165 may carry a sleeve 166 which is keyed to intermediate shaft 163 (for example, via key 163K) so that sleeve 166 can move along the longitudinal axis of intermediate shaft 163 and rotate about such axis. Sleeve 166 may have a bevel gear 166B.

Sliding gear housing 165 may also carry a drive shaft 167, which is rotatingly received by and extends through front trunnion plate 137, and may be rotatingly received and connected to rear trunnion plate 138. Drive shaft 167 may have a bevel gear 167B disposed within the sliding gear housing 165, which preferably meshes with bevel gear 166B. Accordingly, when crank wheel 161 is rotated, crank, intermediate and drive shafts 162, 163, 167 rotate as well.

Drive shaft 167 also has a worm gear 167W disposed thereon, which rotates when crank wheel 161 and crank, intermediate and drive shafts 162, 163, 167 rotate. Worm gear 167 preferably meshes with a rack 140R on arbor bracket 140. Accordingly, when a user rotates crank wheel 161, crank, intermediate and drive shafts 162, 163, 167 rotate, causing the rotation of arbor bracket 140. In this manner, the height of blade 131 can be adjusted.

Figure 5:
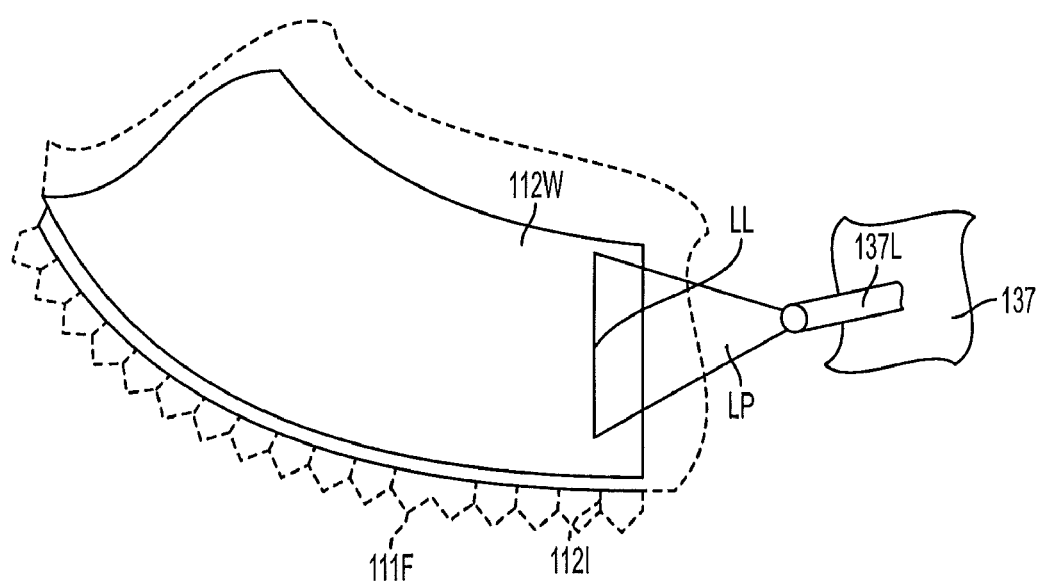
FIG. 5 is a perspective view of a bevel angle indicator assembly according to the invention.
Figure 4B:
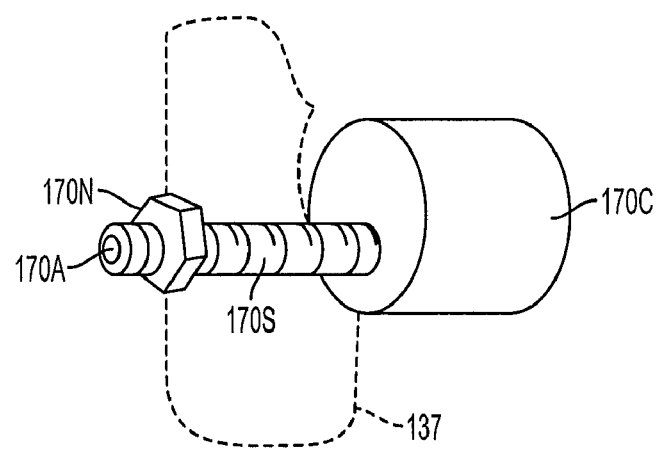

Persons skilled in the art will recognize that the height adjustment mechanism may use a threaded rod and a follower nut, as shown in FIG. 5 of U.S. Pat. No. 5,875,668, which is wholly incorporated by reference, instead of worm gear 167W. Alternately, the height adjustment mechanism may move the blade and/or motor along substantially vertical guide bars, as shown in FIG. 1 of U.S. Pat. No. 6,009,782, which is wholly incorporated by reference, instead of arbor bracket 140. Persons skilled in the art will recognize that the worm gear 167W/rack 140R may be substituted by the bevel gears 33, 34 arrangement shown in FIG. 1 of U.S. Pat. No. 6,009,782.

Persons skilled in the art will recognize that, as the bevel angle is adjusted, the movement of drive shaft 167 will cause sliding gear housing 165 to move along intermediate shaft 163. In such manner, a mechanical connection is preferably always maintained between crank wheel 161 and worm gear 167W, regardless of bevel angle. Such persons will also recognize that intermediate shaft 163 may rotate about crank shaft 162 along direction A.

Persons skilled in the art will recognize that crank and/or drive shafts 162, 163, 167 may be made of steel. In addition, persons skilled in the art will recognize that bevel and/or worm gears 162B, 163B, 166B, 167B, 167W may be made of powdered metal or cut steel.

Persons skilled in the art will recognize that the height and/or bevel angle of blade 131 can be adjusted by rotating two crank wheels which are disposed on the front of base assembly 110, and that the position of such crank wheels relative to base assembly 110 (i.e., the rotational axes of such crank wheels) do not vary substantially regardless of the blade height or bevel angle. Alternatively, persons skilled in the art will recognize that the two crank wheels may be disposed on other sides of base assembly 110, so long as both crank wheels are on the same side.

It is preferable to provide the front trunnion plate 137 with a shaft (not shown) extending forwardly and through a slot 112 disposed on the front panel 111F. A pointer 137P may be attached to such shaft, for indicating the bevel angle of the blade 131. Front panel 111F may have indicia 112I adjacent to slot 112 showing the bevel angle of the blade 131.

An alternate bevel angle indicator is shown in FIG. 5, where like numerals refer to like parts. A laser beam generator 137L is disposed on front trunnion plate 137. Generator 137L preferably generates a laser plane LP (by use of a cylindrical lens or other optical means such as those disclosed in U.S. Pat. No. 5,539,990, which is wholly incorporated herein by reference), a laser point, or any other pattern, such as a grid, etc.

Such laser beam is emitted towards a window 112W disposed in slot 112. Window 112W may be partly opaque, partly translucent and/or textured, so that the laser beam can be seen through the window 112W. For example, a laser indicator or line LL would show in window 112W. As blade 131 is beveled, front trunnion plate 137 would rotate, moving generator 137L along (and thus the emitted laser beam and laser indicator LL). The user can determine the bevel angle by comparing the laser indicator LL to indicia 112I. Persons skilled in the art will recognize that the indicia 112I may be provided on window 112W.

Figure 6:
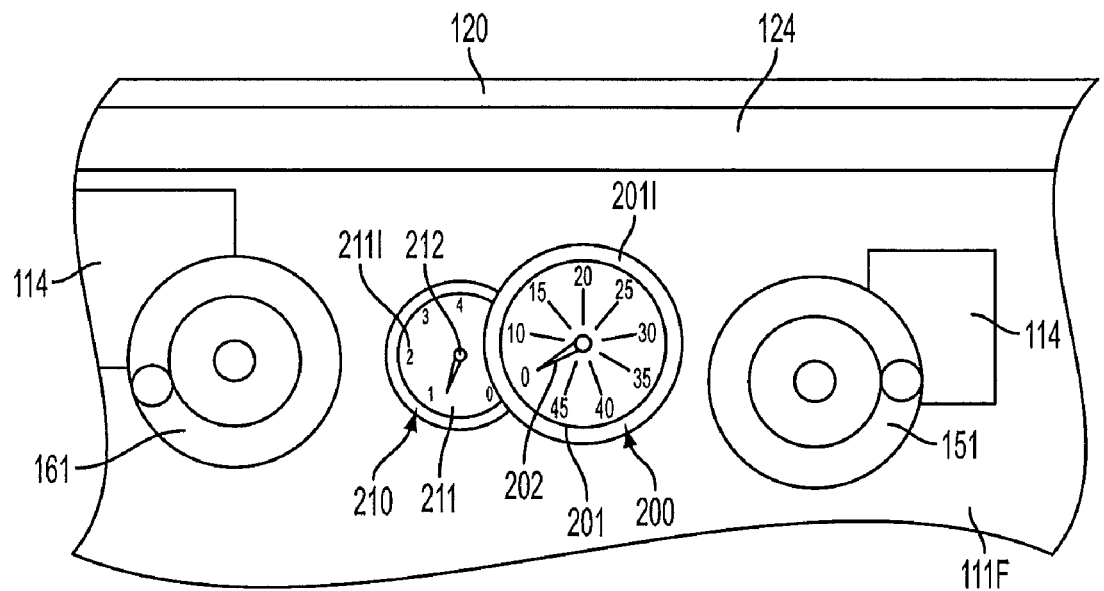
FIG. 6 is a front view of bevel angle and height indicator assemblies according to the invention.

FIGS. 2 and 6 illustrate an alternate bevel angle indicator assembly 200. Bevel angle indicator assembly 200 may include a rack 136R disposed on rear fixed plate 136, a pinion 138P meshing with rack 136R and supported by rear trunnion plate 138, and a cable 138C connected to pinion 138P. Persons skilled in the art will recognize that rack 136R and pinion 138P may be disposed instead on rear trunnion plate 138 and rear fixed plate 136, respectively. Similarly, persons skilled in the art will recognize that rack 136R and pinion 138P may be disposed instead on front fixed plate 135 and front trunnion plate 137, respectively or vice versa.

Cable 138C is preferably connected to a gauge 201 mounted on front panel 111F. Persons skilled in the art are referred to U.S. Pat. No. 3,934,478, which is wholly incorporated herein, for an exemplary construction of gauge 201. Gauge 201 may include a rotatable pointer 202 visually interacting with indicia 201I. Persons skilled in the art will recognize that pointer 202 would be connected to the shaft of helical gear 66 and/or the shaft of pinion gear 68 of U.S. Pat. No. 3,934,478.

With such arrangement, as blade 131 is beveled, rear trunnion plate 138 rotates relative to rear fixed plate 136, causing pinion 138P to rotate along rack 136R. The rotation of pinion 138P causes the rotation of cable 138C and (through the reduction gears of gauge 201) pointer 202, thus indicating the bevel angle.

Figure 7:
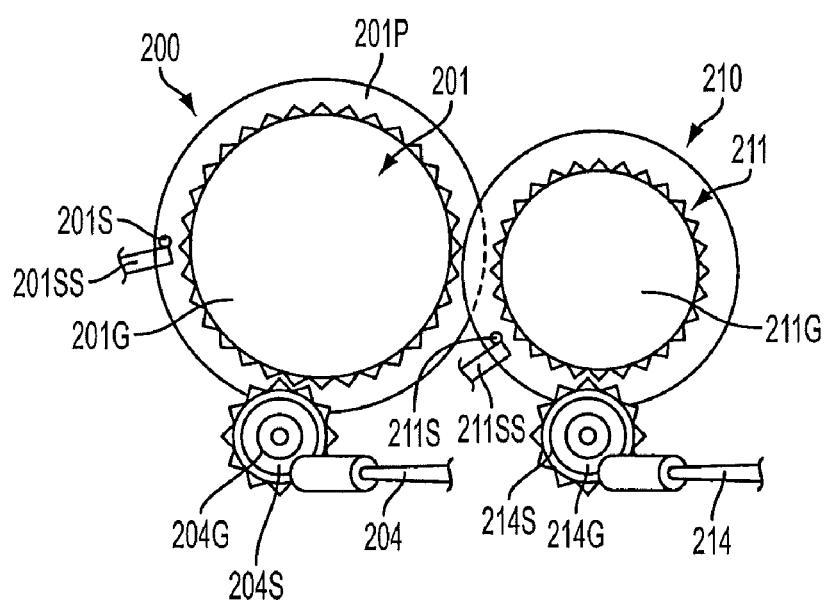
FIG. 7 is a rear view of alternate bevel angle and height indicator assemblies according to the invention.

FIGS. 2 and 7 illustrate another alternate bevel angle indicator assembly 200, where like numerals refer to like parts. Bevel angle indicator assembly 200 may include a cable 204 attached to front trunnion plate 137 or rear trunnion plate 138. Cable 204 is preferably connected to a gear 204G, which rotates as cable 204 is pulled. Gear 204G may be mounted on front panel 111F or within a housing of gauge 201, which in turn is preferably mounted to front panel 111F.

Unlike in the previous embodiment, pointer 202 is preferably fixed within the housing of gauge 201. A rotatable plate 201P carrying the indicia 201I and preferably disposed within the housing of gauge 201 rotates instead. Plate 201P is connected to a gear 201G, which meshes with gear 204G. Accordingly, as blade 131 is beveled, front trunnion plate 137 rotates, pulling cable 204 and rotating gear 204G. Gear 204 in turn causes gear 201G (and thus plate 201P) to rotate and appropriately indicate the bevel angle.

Preferably gears 201G and/or 204G have a spring 204S for biasing plate 201P to the original position when blade 131 is rotated back to zero degrees. Plate 201P preferably has a stop pin 201S that will contact a zero stop 201SS in gauge 201 so that plate 201P is always at the zero position.

Referring to FIGS. 2 and 6, table saw 100 may have a blade height angle indicator assembly 210. Blade height indicator assembly 210 may include a rack 139R disposed on beam 139, a pinion 134P meshing with rack 139R and supported by arbor bracket 140 and/or riving knife 134R, and a cable 134C connected to pinion 134P. Persons skilled in the art will recognize that rack 139R and pinion 134P may be disposed instead on arbor bracket 140 and/or riving knife 134R and beam 139, respectively. Similarly, persons skilled in the art will recognize that rack 139R and pinion 134P may be disposed instead on arbor bracket 140, front trunnion plate 137 and rear trunnion plate 138, respectively or vice versa.

Cable 134C is preferably connected to a gauge 211 mounted on front panel 111F. Persons skilled in the art are referred to U.S. Pat. No. 3,934,478, which is wholly incorporated herein, for an exemplary construction of gauge 211. Gauge 211 may include a rotatable pointer 212 visually interacting with indicia 211I. Persons skilled in the art will recognize that pointer 202 would be connected to the shaft of helical gear 66 and/or the shaft of pinion gear 68 of U.S. Pat. No. 3,934,478.

With such arrangement, as the height of blade 131 is adjusted, riving knife 134 and/or arbor bracket 140 rotate relative to beam 139, causing pinion 134P to rotate along rack 139R. The rotation of pinion 134P causes the rotation of cable 134C and (through the reduction gears of gauge 211) of pointer 212, thus indicating the blade height.

FIGS. 2 and 7 illustrate another alternate blade height indicator assembly 210, where like numerals refer to like parts. Blade height indicator assembly 210 may include a cable 214 attached to arbor bracket 140. Cable 214 is preferably connected to a gear 214G, which rotates as cable 214 is pulled. Gear 214G may be mounted on front panel 111F or within a housing of gauge 211, which in turn is preferably mounted to front panel 111F.

Unlike in the previous embodiment, pointer 212 is preferably fixed within the housing of gauge 211. A rotatable plate 211P carrying the indicia 211I and preferably disposed within the housing of gauge 211 rotates instead. Plate 211P is connected to a gear 211G, which meshes with gear 214G. Accordingly, as the height of blade 131 is increased, arbor bracket 140 rotates, pulling cable 214 and rotating gear 201G. Gear 214 in turn causes gear 211G (and thus plate 211P) to rotate and appropriately indicate the blade height.

Preferably gears 211G and/or 214G have a spring 214S for biasing plate 211P to the original position when blade 131 is rotated back to zero height. Plate 211P preferably has a stop pin 201S that will contact a zero stop 211SS in gauge 211 so that plate 211P is always at the zero position.

Persons skilled in the art will recognize that in an alternate arrangement, plate 211P may be fixed relative to the gauge housing, whereas pointer 212 could be attached to gear 211G, so that pointer 212 rotates instead of plate 211P.

Referring to FIGS. 1-4, it is preferable to provide at least one bevel stop 170, which limits the range of movement of front trunnion plate 137 (and thus of the bevel angle of blade 131). Bevel stop 170 is preferably mounted on front fixed plate 135.

Basically, bevel stop 170 preferably includes an eccentric cam 170C for contacting (and thus limiting the range of movement of) front trunnion plate 137. Cam 170C may be made of steel or powdered metal. Cam 170C is preferably connected to a shaft 170S, which may be threaded and extending through front trunnion plate 137. Shaft 170S may have a notch 170A for receiving a tool, such as a Philips® screwdriver or Allen wrench.

Cam 170C may be rotated to adjust the bevel stop by inserting a tool into notch 170A and rotating shaft 170S. Accordingly, the user can adjust cam 170C by rotating nut 170N or releasing nut 170N, manually adjusting cam 170C and retightening nut 170N. Preferably front panel 111F has a through-hole or door 114 which provides the user access to nut 170N and/or cam 170C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A table saw comprising:
   a base assembly;
   a table assembly supported by the base assembly;
   a saw assembly connected to at least one of the base assembly and the table assembly, the saw assembly having a blade extending through the table assembly, a front trunnion plate pivotally attached to the at least one of the base assembly and the table assembly, a rear trunnion plate pivotally attached to the at least one of the base assembly and the table assembly, and an arbor bracket pivotably attached to the front trunnion plate, the front trunnion plate having a first rack;
   a height adjustment assembly for adjusting the height of the blade, the height adjustment assembly comprising a height adjustment wheel;

a bevel adjustment assembly for adjusting the bevel angle of the blade, the bevel adjustment assembly comprising a bevel adjustment wheel; and a bevel angle indicator having a second rack disposed on one of the at least one of the base assembly and the table assembly and one of the front and rear trunnion plates, a first pinion meshingly engaging the second rack and disposed on the other of the one of the front and tear trunnion plates and the at least one of the base assembly and the table assembly, a first cable connected to the first pinion, and a first gauge connected to the first cable and disposed on at least one of the base assembly and the table assembly.

2. The table saw of claim 1, further comprising a blade height indicator having a third rack disposed on one of the front trunnion plate and the arbor bracket, a second pinion meshingly engaging the third rack and disposed on the other of the front trunnion plate and the arbor bracket, a second cable connected to the second pinion, and a second gauge connected to the second cable and disposed on at least one of the base assembly and the table assembly.

3. A table saw comprising:

a base assembly;

a table assembly supported by the base assembly;

a saw assembly connected to at least one of the base assembly and the table assembly, the saw assembly having a blade extending through the table assembly, a front trunnion plate pivotally attached to the at least one of the base assembly and the table assembly, a rear trunnion plate pivotally attached to the at least one of the base assembly and the table assembly, and an arbor bracket pivotably attached to the front trunnion plate, the front trunnion plate having a first rack;

a height adjustment assembly for adjusting the height of the blade, the height adjustment assembly comprising a height adjustment wheel;

a bevel adjustment assembly for adjusting the bevel angle of the blade, the bevel adjustment assembly comprising a bevel adjustment wheel; and a blade height indicator having a second rack disposed on one of the front trunnion plate and the arbor bracket, a first pinion meshingly engaging the second rack and disposed on the other of the front trunnion plate and the arbor bracket, a first cable connected to the first pinion, and a first gauge connected to the first cable and disposed on at least one of the base assembly and the table assembly.

4. The table saw of claim 3, further comprising a bevel angle indicator having a third rack on one of the at least one of the base assembly and the table assembly and one of the front and rear trunnion plates, a second pinion meshingly engaging the third rack and disposed on the other of the one of the front and rear trunnion plates and the at least one of the base assembly and the table assembly, a second cable connected to the second pinion, and a second gauge connected to the second cable and disposed on at least one of the base assembly and the table assembly.

* * * * *